United States Patent [19]
Eipper et al.

[11] Patent Number: 6,070,448
[45] Date of Patent: *Jun. 6, 2000

[54] METHOD OF USING PROFILES, AND PRODUCING METAL SHEETS WITH STEPPED CROSS-SECTIONS AND DIFFERENT WALL THICKNESSES

[75] Inventors: Konrad Eipper, Ammerbuch; Wolfgang Fussnegger, Gaertringen; Christoph Schlott, Sindelfingen, all of Germany

[73] Assignee: DaimlerChrysler AG, Stuttgart, Germany

[ * ] Notice: Under 35 U.S.C. 154(b), the term of this patent shall be extended for 811 days.

[21] Appl. No.: 08/724,306

[22] Filed: Sep. 9, 1996

Related U.S. Application Data

[63] Continuation of application No. 08/316,443, Oct. 3, 1994, abandoned.

[30] Foreign Application Priority Data

Oct. 1, 1993 [DE] Germany ............... 43 33 500

[51] Int. Cl.⁷ ...................................... B21B 1/38
[52] U.S. Cl. ............................. 72/363; 72/365.2
[58] Field of Search ............ 29/415, 425; 72/254, 72/256, 363, 365.2, 366.2

[56] References Cited

U.S. PATENT DOCUMENTS

| | | |
|---|---|---|
| 1,915,084 | 6/1933 | Bonsall . |
| 2,798,604 | 7/1957 | Todd .......................... 72/254 |
| 3,164,898 | 1/1965 | Kotrbaty ..................... 72/256 |
| 3,540,117 | 11/1970 | Kennedy et al. ............ 72/363 |
| 3,683,471 | 8/1972 | Lemelson . |
| 5,108,519 | 4/1992 | Armanie et al. . |

FOREIGN PATENT DOCUMENTS

| | | |
|---|---|---|
| 1218232 | of 0000 | France . |
| 1 960 460 | of 0000 | Germany . |
| 492 826 | of 0000 | Germany . |
| 703 100 | of 0000 | Germany . |
| 1 132 080 | 6/1962 | Germany . |
| 1 452 646 | 3/1969 | Germany . |
| 2 343 579 | 3/1974 | Germany . |
| 63-072407 | of 0000 | Japan . |
| 88942 | 7/1980 | Japan ...................... 72/256 |
| 5-104187 | 4/1993 | Japan . |
| 5-96338 | 4/1993 | Japan . |

*Primary Examiner*—Lowell A. Larson
*Attorney, Agent, or Firm*—Evenson McKeown Edwards & Lenahan, P.L.L.C.

[57] ABSTRACT

In a method of using a closed, extruded profile, developing a hollow profile and producing a stepped cross-sectional metal sheet with different wall thicknesses, the profile or the hollow profile is used as a starting material for rolling. The hollow profile has only one wall, which turns back in on itself in the peripheral direction without branching and is of different thicknesses at different points of the periphery. The hollow profile is separated along a surface line, is formed into the semifinished article and is subsequently rolled to produce the metal sheet.

4 Claims, 1 Drawing Sheet

METHOD OF USING PROFILES, AND PRODUCING METAL SHEETS WITH STEPPED CROSS-SECTIONS AND DIFFERENT WALL THICKNESSES

This application is a continuation of application Ser. No. 08/316,443, filed on Oct. 3, 1994, now abandoned.

BACKGROUND AND SUMMARY OF THE INVENTION

The present invention relates to the use of a preferably closed, extruded profile, to a development of a hollow profile, and to a process for producing a metal sheet which is stepped in cross-section and has different wall thicknesses, the profile or the hollow profile, for rolling the metal sheet, being stretched out flat before rolling.

U.S. Pat. No. 1,915,084 describes a process for producing a metal sheet which is stepped in cross-section and has different wall thicknesses. The prefabricated semifinished article has one or more flattenings running in the direction of rolling and is intended for producing the metal sheet. The semifinished article is designed such that it is already stepped at the points of the metal sheet which is to be rolled from the semifinished article and will later become steps, and likewise already has different wall thicknesses. The ratios of the wall thicknesses of appertaining regions of the semifinished article and of the finished metal sheet correspond to one another. That is, during rolling of the semifinished article to form the metal sheet, the wall thicknesses of the thicker regions of the semifinished article are reduced by approximately the same factor as the wall thicknesses of the thinner regions. For rolling the metal sheet, the semifinished article is laid in between two rolls. The roll associated with one side of the semifinished article or of the metal sheet has a planar rolling surface, while the roll associated with the other side of the semifinished article or of the metal sheet has a stepped rolling surface.

DE-OS 23 43 579 describes a further process and an apparatus for forming a metal sheet with a stepped cross-section and different material thicknesses. Pre-formed semifinished articles are used for producing the metal sheet by embossing rolling, die working, longitudinal welding on the borders of sheet-metal strips of different thicknesses, cutting, milling or another material-removing method of machining. However, the die working is expedient, however, only with semifinished articles which are comparatively short in the rolling direction, while the longitudinal welding, in particular in the case of light metals, and the material-removing method of machining cause extremely high outlays. In the same way as section rolling of the semifinished article to form the metal sheet, embossing rolling of a blank, designed as a metal block or slab, to form the semifinished article involves high outlay in terms of apparatus and energy. Thus, particularly with respect to the rolling of the semifinished article, the pressure which is to be applied and/or the energy requirement for tempering the metal of the blank during rolling can be very high. Furthermore, rolling trains of this type require a large amount of space, and control of the machine requires an extremely high outlay because, inter alia, the angular speed of those regions of the stepped roll which roll those portions of the metal sheet of a thinner wall thickness has to be lower than that of those regions of said roll which roll the thicker portions. These different angular speeds are therefore necessary in order that the tangential speed of these roll regions, having different diameters, is approximately the same.

DE-OS 14 52 646 describes a process for producing components, in particular closed hollow load-bearing members, whose wall thicknesses vary in accordance with the loading to which they are subjected. Furthermore, the hollow load-bearing member has only one wall, which turns in on itself in the peripheral direction without branching. A semifinished article is rolled from a sheet-metal strip, which is used as blank and is of a uniform cross-section.

The cross-sectional progression of said semifinished article is stepped and the different wall thicknesses of the semifinished article already corresponding to the desired wall thicknesses of the component which is to be formed therefrom. In this known arrangement, the cross-sectional progression of the semifinished article is selected such that the component can be bent from the semifinished article, with the regions of greater wall thickness being arranged at those points of the component which are subjected to higher loading. Finally, the free, abutting longitudinal borders of the semifinished article are then welded to one another.

An object of the present invention is to simplify the production of a metal sheet which is stepped in cross-section and has different wall thicknesses. It is a further object of the present invention for the metal sheet produced to exhibit, at least on one side, a surface finish which is suitable for an outer side, for example, of a vehicle body.

The foregoing objects have been achieved according to the present invention by the use of an extruded profile with different wall thicknesses in which the profile is stretched and flat before rolling, by a tubular hollow profile which is closed on the periphery, and by a process characterized in that for the production of the semifinished article, a hollow profile, having a wall-thickness progression distributed over the periphery thereof and corresponds to a desired wall-thickness progression of the semifinished article, is extruded from a blank, and the hollow profile is separated along a surface line and is formed into the semifinished article.

By using an extruded profile whose walls correspond to those of a semifinished article produced therefrom, at least a sub-process of the production of the semifinished article is simplified. In particular, this is favorable with metal sheets consisting of light metals because, inter alia, the extrusion method has been developed to an extremely advanced degree here. Furthermore, in comparison with iron or steel, the melting point of light metals is low, for which reason the amount of energy required in extrusion is also comparatively low. By rolling the semifinished article, a high surface finish of the metal sheet is achieved, and good dimensional stability of the metal sheet is also ensured simultaneously by rolling.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
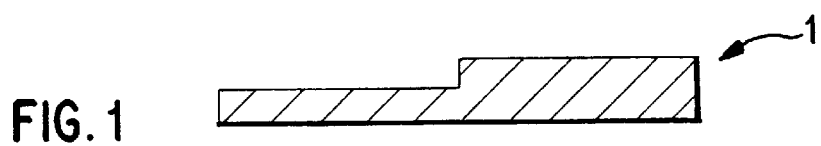
FIG. 1 is a cross-sectional view of an extruded profile for rolling a metal sheet, in which the profile has one step and two different wall thicknesses.

Represented in FIG. 1 is a cross-section of an extruded profile 1 for rolling a metal sheet, in which the profile has one step and two different wall thicknesses. In order to produce the metal sheet, the profile 1, preferably manufactured from aluminum, is laid in a stepped roll arrangement in which the different wall thicknesses of the profile 1 are reduced by approximately the same factor. The use of these types of profiles 1, as well as of the embodiments described hereinbelow, is advantageous, in particular, in making bodies for motor vehicles since, here, the intention is for the weight of the body, in particular for reasons of consumption, to drop and/or the mass increase to be reduced. By using these profiles 1 for rolling stepped metal sheets, in particular at thickness-reducing transition points of the body, cost-effectiveness and process simplification is made possible because the points no longer have to be produced by welding or material-removing measures or high-outlay, laborious rolling processes.

Figure 2:
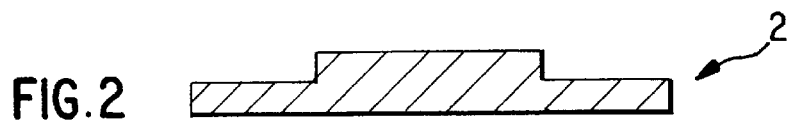
FIG. 2 is a cross-sectional view of a further extruded profile for rolling a metal sheet, in which the profile has two steps and likewise two different wall thicknesses.

FIG. 2 shows a further extruded profile 2 for rolling a metal sheet, which likewise has two different wall thicknesses, but, in contrast to the profile 1 according to FIG. 1, has two steps. The production and the use of this profile 2 are, apart from the mask predetermining the different cross-section of the profile 2, similar to those of the profile 1 of FIG. 1, for which reason they are not dealt with in any more detail here.

Figure 3:
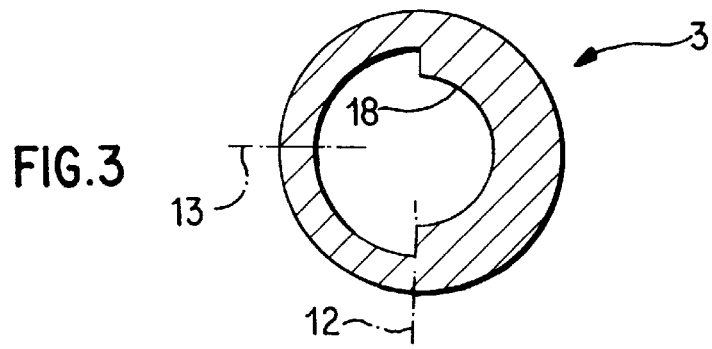
FIG. 3 is a cross-sectional view of a tubular hollow profile for producing two different semifinished articles, corresponding to the profiles according to FIGS. 1 and 2, for two different metal sheets.

In order to manufacture the profiles 1, 2 of FIGS. 1 and 2, respectively, in a conventional manner, two different masks and also separate stock-keeping is required. This can be improved by a tubular hollow profile 3 whose cross-section is shown in FIG. 3. The hollow profile 3 has an approximately circular cross-section, with one half of its wall being configured to be thicker than the other half thereof. In order to produce the profile 1 of FIG. 1, the convex surface of the hollow profile 3 is separated, for example by cutting, along a surface line 12 which is arranged along the "jump" or sudden change in wall thickness, and is then formed into one plane to yield a semifinished article corresponding to the profile 1 of FIG. 1 and is transferred to the roll arrangement for rolling the metal sheet. In order to produce the profile 2 of FIG. 2, the convex surface of the hollow profile 3 is separated along the surface line 13, and is likewise formed and rolled.

Figure 4:
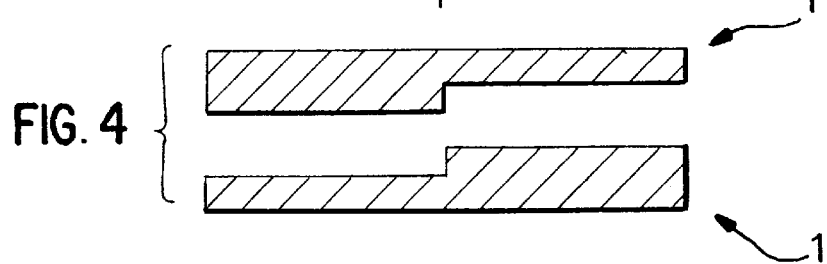
FIG. 4 is a cross-sectional view of two profiles which are laid one upon the other such that they are complementary with respect to one another, corresponding to FIG. 1, having a separator arranged therebetween, for rolling between cylindrical rolls.

The two profiles 1 shown in FIG. 4 are laid one upon the other such that they are complementary with respect to one another and correspond to FIG. 1. A separator is arranged between the profiles 1. This arrangement has the advantage that the profiles 1, laid one upon the other, can be rolled together at the same time. This is particularly advantageous because two metal sheets are produced in a single rolling operation, with simple, non-stepped cylindrical rolls in an easily controllable rolling operation.

Figure 5:
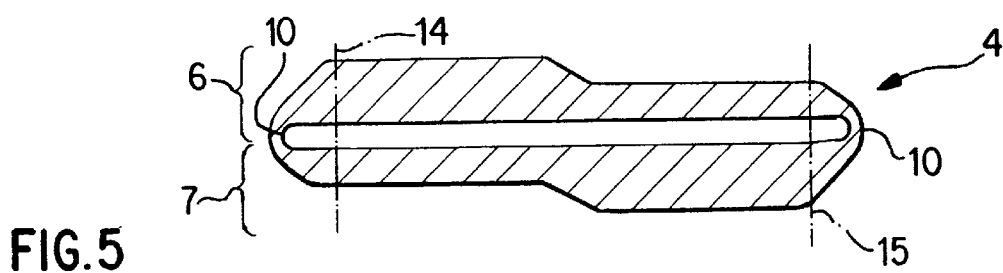
FIG. 5 is a cross-sectional view of an extruded hollow profile having two mutually opposite sub-wall regions which form complementary profiles.

A hollow profile 4 which favors the above method of machining is shown in FIG. 5. The extruded hollow profile 4 is profiled on its outer surface and has in the peripheral direction, a wall thickness progression such that a so-called sub-wall region 6, 7 in the following, occurs periodically, i.e. twice in the illustrated embodiment. In particular, the mutually opposite sub-wall regions 6, 7 are arranged so that they form complementary profiles, with each cross-section of a sub-wall region 6, 7 having a cross-section which is configured in a manner similar to that of the semifinished article to be formed subsequently therefrom, in the present embodiment the profile 1 according to FIG. 1. By virtue of this configuration of the extruded hollow profile 4, the two sub-wall regions 6, 7, forming the profiles, are extruded at the same time in a single operating step. The two sub-wall regions 6, 7 are connected along their longitudinal borders by wall portions 10 which are located in the peripheral direction. The wall portions 10 have a wall thickness which is smaller than the smallest wall thickness of the sub-wall regions 6, 7. Furthermore, the wall portions 10 are bent outwards in order that it is ensured that, when the two sub-wall regions 6, 7 are pressed against one another, they are displaced out of the abutment region thereof.

In order to permit a favorable production of the metal sheet, it is advantageous, in this arrangement to separate the two sub-wall portions 6, 7 at two opposite surface lines 14, 15 before rolling, in doing so removing the two wall portions 10. It is also possible, however, in principle to separate the two wall portions 10 only after rolling has taken place. In order to permit separation of the two sub-wall regions 6, 7 which have been rolled together, it is expedient to arrange a separator between the first sub-wall region 6 and the opposite second sub-wall region 7.

Figure 6:
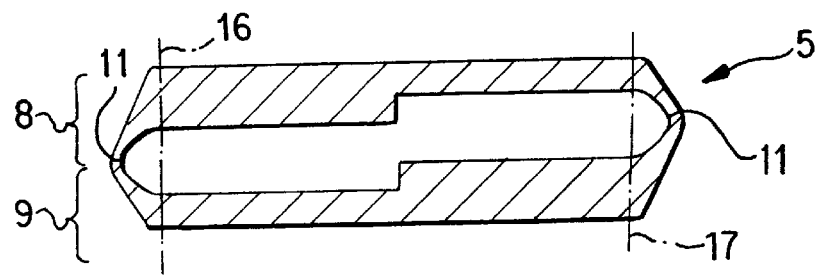
FIG. 6 is a cross-sectional view of a further extruded hollow profile having two complementary sub-wall regions which are located opposite one another in alignment and are profiled exclusively on its inner surface.

A hollow profile 5 which is suitable for a common rolling operation using cylindrical, non-stepped rolls is shown in FIG. 6. The hollow profile 5 is configured such that it is profiled exclusively on its inner surface. The two sub-wall regions 8, 9, which are arranged in a complementary manner with respect to one another, are aligned opposite one another. Consequently, the pressing-together of the sub-wall regions 8, 9, with the interposition of a separator, is simplified. Likewise, the outlay during the subsequent rolling is reduced.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of using extruded profiles produceable from a hollow profile with one side of each of the profiles having a stepped portion defining different wall thicknesses and an opposing side of each of the profiles having continuous flat faces as starting material, comprising the steps of arranging the extruded profiles relative to each other so that the continuous flat faces of the opposing side of each of the profiles are disposed outwardly and substantially parallel to each other such that a thicker portion on the one side of one profile faces a thinner portion of the one side of the other profile, and rolling the outwardly disposed continuous flat faces with non-profiled cylindrical rolls providing continuous line contact to form solid-profiled metal sheets having individually selected stall thicknesses.

2. A process for producing metal sheets having different wall thicknesses, comprising the steps of producing semifinished profiles from a hollow tubular profile, each of which has a continuous flat face on one side, a stepped face on an opposite side so as to define different wall thicknesses with approximately the same thicknesses as the metal sheets, arranging the semifinished profiles relative to each other so that the continuous flat faces are disposed outwardly and parallel with the stepped faces opposing each other such that a thicker portion of one profile opposes a thinner portion of another profile, and rolling, with a non-profiled roller providing continuous line contact, the continuous flat faces of the semifinished profiles into the metal sheets.

3. The process according to claim 2, wherein the blank is extruded from a light metal.

4. The process according to claim 2, wherein the blank is aluminum.

* * * * *